United States Patent [19]

King

[11] Patent Number: 5,895,633

[45] Date of Patent: *Apr. 20, 1999

[54] SOLVENT EXTRACTION PROCESS FOR RECOVERING COPPER FROM COPPER-CONTAINING SOLUTIONS

[75] Inventor: James A. King, West Vancouver, Canada

[73] Assignee: Placer Dome, Inc., Vancouver, Canada

[*] Notice: This patent is subject to a terminal disclaimer.

[21] Appl. No.: 08/990,901

[22] Filed: Dec. 15, 1997

Related U.S. Application Data

[63] Continuation of application No. 08/561,796, Nov. 22, 1995, Pat. No. 5,698,170.

[51] Int. Cl.$^6$ .............................. B01D 11/00; C01G 3/00; C22B 15/00
[52] U.S. Cl. ........................... 423/24; 423/27; 423/41
[58] Field of Search ............................. 423/24, 27, 41

[56] References Cited

U.S. PATENT DOCUMENTS

| | | | |
|---|---|---|---|
| 2,829,964 | 4/1958 | Zimmerley et al. | 75/104 |
| 3,260,593 | 7/1966 | Zimmerley et al. | 75/117 |
| 3,305,353 | 2/1967 | Duncan et al. | 75/101 |
| 3,347,661 | 10/1967 | Mayling | 75/104 |
| 3,455,679 | 7/1969 | Mayling | 75/101 |
| 3,607,235 | 9/1971 | Duncan | 75/101 |
| 3,669,651 | 6/1972 | Spedden et al. | 75/104 |
| 3,679,397 | 7/1972 | O'Conner et al. | 75/101 |
| 3,856,913 | 12/1974 | McElroy et al. | 423/27 |
| 4,017,309 | 4/1977 | Johnson | 75/101 R |
| 4,020,106 | 4/1977 | Ackerley et al. | 423/24 |
| 4,028,462 | 6/1977 | Domic et al. | 423/24 |
| 4,029,733 | 6/1977 | Fangeras et al. | 423/24 |
| 4,150,976 | 4/1979 | Dain et al. | 423/24 |
| 4,507,268 | 3/1985 | Kordosky et al. | 423/24 |
| 4,571,387 | 2/1986 | Bruynesteyn et al. | 435/262 |
| 4,971,662 | 11/1990 | Sawyer et al. | 423/24 |
| 5,223,024 | 6/1993 | Jones | 75/743 |
| 5,316,567 | 5/1994 | Jones | 75/743 |

*Primary Examiner*—Steven Bos
*Attorney, Agent, or Firm*—Sheridan Ross PC

[57] ABSTRACT

The present invention is directed to a process for recovering copper from a copper-containing material by pressure oxidation followed by solvent extraction and electrowinning. The copper-containing solution formed by pressure oxidation is diluted before solvent extraction and the raffinate solution from solvent extraction is neutralized to reduce the acid levels in the raffinate solution.

14 Claims, No Drawings

SOLVENT EXTRACTION PROCESS FOR RECOVERING COPPER FROM COPPER-CONTAINING SOLUTIONS

This is a continuation of application Ser. No. 08/561,796, filed Nov. 22, 1995, now U.S. Pat. No. 5,698,170.

FIELD OF THE INVENTION

This invention relates generally to a process for recovering copper from copper-containing materials and specifically to a process for recovering copper from copper sulfides, such as chalcopyrite.

BACKGROUND OF THE INVENTION

Copper deposits typically have copper-bearing zones at different depths that contain different copper-bearing minerals. Copper oxides, such as malachite and chrysocolla, are located in an upper weathered zone. A mixture of copper sulfides, such as chalcocite, covellite, and chalcopyrite and copper oxides are generally located below the upper weathered zone in an intermediate enriched zone. Chalcopyrite is generally located in a primary mineralized zone below the intermediate enriched zone.

The copper in the ores from the various zones is recovered by different techniques. The copper in the ore from the upper weathered and intermediate enriched zones is typically recovered by heap leaching techniques. Because it is difficult to economically recover the copper in the chalcopyrite located in the primary mineralized zone by heap leaching techniques, copper in ore from the primary mineralized zone is recovered by other techniques.

Smelting and refining is the traditional approach used to recover the copper in the ore from the primary mineralized zone. Because the smelting and refining process is expensive, the copper sulfides in the ore are first concentrated into a copper sulfide concentrate by flotation techniques to provide a smaller volume of material for smelting. The sulfide concentrate is then shipped to a smelter/refiner which heats the concentrate to high temperatures to form a crude copper product which is refined to a highly pure metal. In recent years, the smelting and refining process has fallen into disfavor due to environmental problems associated with the disposal of smelting and refining byproducts and increases in smelting and refining costs.

A process developed as an alternative to smelting and refining is to slurry the copper sulfide concentrate and oxidize the sulfur in the copper sulfides to sulfuric acid and the copper to copper sulfate under conditions of high temperature and superatmospheric pressure to form a copper-containing solution. The copper is recovered from the solution by solvent extraction and electrowinning techniques to provide a cathode copper product of high purity at the mine site. Because a high acid concentration is undesirable in solvent extraction due to unfavorable equilibrium conditions, the leach solution is neutralized before solvent extraction and electrowinning using lime or an acid-consuming, low-grade copper ore. Unlike the smelting and refining process, this process does not generate harmful offgases and other harmful byproducts and is therefore more environmentally safe than smelting and refining.

Although the process is more environmentally safe than smelting and refining, this process has unacceptably high copper losses. The use of lime to neutralize the acid in the solution not only increases operating costs due to lime consumption but also forms a low pulp density slurry from which it is difficult to recover the copper. Alternatively, the percolation of the solution through a heap of an acid-consuming, low-grade copper ore to neutralize the acid in the solution can cause copper losses in the heap.

There is a need for a low-cost method to recover copper from copper-containing sulfides, especially copper from copper sulfides such as chalcopyrite, that has a high copper recovery rate.

SUMMARY OF THE INVENTION

The present invention provides a low-cost method to recover copper from a copper-containing material, especially copper from copper sulfides such as chalcopyrite, that has a high metal recovery rate. The process includes the steps: (i) first contacting a copper-containing material with a liquid to yield a residue and a copper-containing solution, with the copper-containing solution containing an acid; (ii) second contacting the copper-containing solution with an aqueous diluent containing no more than about 5 grams/liter acid to yield a diluted copper-containing solution having an acid concentration ranging from about 2 to about 8 grams/liter; and (iii) solvent extracting the copper from the diluted copper-containing solution. The use of the diluent to reduce acid levels in the copper-containing solution sufficiently for favorable equilibrium conditions during solvent extraction significantly reduces copper losses relative to many existing processes which neutralize the acid in the solution before solvent extraction.

The copper-containing material can be an ore, concentrate, or the like. In most cases, the copper-containing material is a sulfide flotation concentrate. The amount of copper in the copper-containing material is typically no more than about 40% by weight and more typically from about 20 to about 30% by weight. The copper can be in the form of an oxide or sulfide. The copper-containing material can include other metals such as gold, silver, platinum group metals, and mixtures thereof. The present invention is especially useful for liberating copper from sulfides, especially copper from the copper sulfides, chalcopyrite ($CuFeS_2$), chalcocite ($Cu_2S$), bornite ($Cu_5FeS_4$), covellite ($CuS$), tetrahedrite ($Cu_{12}(Sb, As)_4S_{13}$, and digenite ($Cu_9S_5$).

The first contacting step can be a pressure oxidation step conducted at superatmospheric pressure and a temperature ranging from about 170° C. to about 230° C. in an oxygen-containing atmosphere. The oxidation of the sulfur in the copper-containing material yields sulfuric acid. The copper-containing solution can include sulfuric acid in a concentration ranging from about 10 to about 100 grams/liter.

In the second contacting step, a sufficient amount of diluent is contacted with the copper-containing solution to yield a diluted copper-containing solution with an acid concentration ranging from about 2 to about 8 grams/liter. Preferably, the ratio of the copper-containing solution to the diluent ranges from about 1:10 to about 1:500.

In a preferred embodiment, the copper-containing solution is a slurry containing the residue and the second contacting step includes separating the residue from the copper-containing solution. The residue can be further treated to recover additional metals of value contained in the residue. An aqueous diluent, preferably fresh water, is used to assist in washing the residue to remove the copper-containing solution. The copper-containing solution can contain substances, such as copper or sulfuric acid, which can complicate the recovery of metals from the residue. By way of example, sulfuric acid and/or copper can significantly reduce the recovery of precious metals, such as gold and silver, from the residue, using the conventional cyanidation process.

In the solvent extraction step, the diluted copper-containing solution is preferably contacted with a solvent extraction circuit having at least two and more preferably three extraction stages. The multiplicity of extraction stages is desired to ensure a high recovery extraction of copper from the diluted copper-containing solution produced in the second contacting step, into the organic phase of the solvent extraction process.

Because the diluted copper-containing solution contains a significant amount of acid, the diluted copper-containing solution is preferably contacted with relatively strong reagents to maintain high metal recovery rates. Preferred reagents include aldoximes and modified aldoximes, such as "HENKELS L1X622N".

Where all or a portion of the raffinate solution from the solvent extraction step is recycled, it is preferred that the raffinate solution be contacted with a base material to reduce the acid content of the raffinate solution. As will be appreciated, in the absence of acid neutralization, the recycle of the raffinate solution can result in excessively high acid levels in the various steps of the process which can significantly reduce metal recovery rates.

In another embodiment, a process is provided for recovering copper from copper-containing material which includes the steps: (i) oxidizing a copper-containing material under superatmospheric pressure to yield a residue and a copper-containing solution, with the copper-containing solution containing an acid; (ii) solvent extracting the copper from the copper-containing solution using a solvent extraction circuit having at least two extraction stages to yield a raffinate solution; and (iii) contacting the raffinate solution with a base material to decrease the acid content of the raffinate solution. The base material can be an acid-consuming rock, such as an ore or concentrate derived from the upper weathered or intermediate enriched zones of a copper deposit. The acid in the raffinate solution can thus be used to leach copper from the acid-consuming rock, which can significantly reduce the overall acid consumption requirements of a process recovering copper from copper-containing materials from a variety of mineralized zones. The raffinate solution can be percolated through a heap of the acid-consuming rock to yield a neutralized raffinate solution, with the raffinate solution including an amount of acid ranging from about 4 to about 8 grams/liter and the neutralized raffinate solution including an amount of acid ranging from about 0.5 to about 2 grams/liter.

In a further embodiment, a process for recovering copper from copper-containing material is provided, including the steps: (i) contacting a copper-containing material with a liquid to yield a residue and a copper-containing solution, with the copper-containing solution containing an acid and (ii) solvent extracting the copper from the copper-containing solution. The copper-containing solution is not contacted with a base material before the solvent extraction step. As noted above, the contacting of the copper-containing solution with a base material before solvent extraction can result in significant losses of copper from the copper-containing solution.

DETAILED DESCRIPTION

Figure 1:
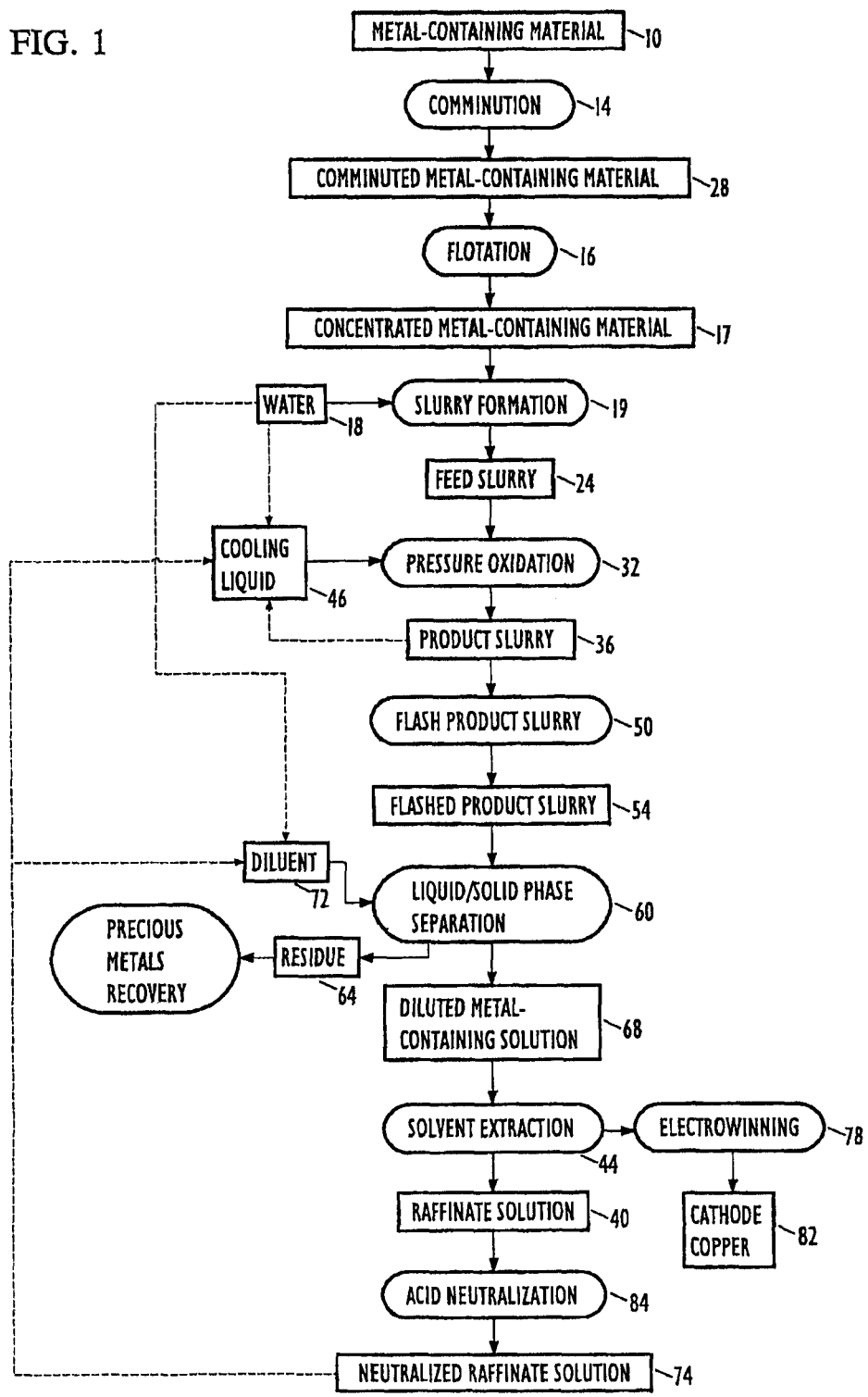
FIG. 1 is a flow schematic of a preferred embodiment of the present invention.

The present invention is based on the discovery that the copper losses experienced in prior art pressure oxidation processes result from the physical entrainment of dissolved copper in the pores and voids of acid-consuming ore used for neutralization. Further, additional copper losses can be caused by the reaction of dissolved copper with the clays and other minerals in the acid-consuming ore and also by the entrapment of dissolved copper by iron containing precipitates (e.g. ferric hydroxide) within the pores and voids in the ore particles. As will be appreciated, as the acid-containing solution produced by pressure oxidation percolates through a heap of ore particles, acid in the solution is consumed, causing the pH of the solution to increase. The pH of the solution in a lower part of the heap is therefore higher than the pH of the solution in an upper part of the heap. Pores and voids in the ore particles, which contain acid-containing solution, can become clogged by the precipitation of ferric hydroxides at the higher solution pH's. The copper in the solution in the clogged pores and voids is thus rendered essentially nonrecoverable.

The present invention inhibits copper loss by neutralizing the acid generated in pressure oxidation after, and preferably not before, solvent extraction and electrowinning. In this manner, dissolved copper is not lost in the neutralization step before solvent extraction and electrowinning. To provide sufficiently low acid levels in the copper-containing solution formed by pressure oxidation (which can contain up to about 100 grams/liter of acid) and thereby establish favorable equilibrium conditions during solvent extraction, the copper-containing solution can be contacted with an aqueous diluent containing no more than about 3 grams/liter acid to yield an acid concentration in a diluted copper-containing solution ranging from about 2 to about 8 grams/liter. A number of solvent extraction circuits can be used to accommodate the large volume of the diluted copper-containing solution caused by the high rate of dilution. Strong solvent extraction reagents can be employed to offset the acid content of the diluted copper-containing solution and thereby provide more favorable solvent extraction equilibrium conditions for copper recovery.

FIG. 1 depicts a preferred embodiment of the present invention where copper is the primary metal to be recovered from the copper-containing material. As will be appreciated, the teachings of the present invention are applicable to a variety of other process configurations and are not limited to the preferred embodiment.

The copper-containing material 10 is comminuted 14, subjected to flotation 16 to form a concentrated copper-containing material 17, and the concentrated copper-containing material 17 is combined with water 18 during slurry formation 19 to yield a feed slurry 24. Slurry formation 19 can occur in any suitable mixing vessel. The concentrated copper-containing material 17 preferably has a size ranging from about 10 to about 100 microns and more preferably has a size distribution such that no more than 20% of the concentrated copper-containing material 17 is larger than about 30 microns. Additional comminution (not shown) of the concentrated copper-containing material 17 may be necessary to yield such a size distribution. As will be appreciated, increasing the fineness of the concentrated copper-containing material 17 will increase the reaction rate in pressure oxidation 32 and permit the use of smaller, more economical autoclave reactors during pressure oxidation 32. The feed slurry 24 has a preferred liquid-solid ratio ranging from about 2:1 to about 1:2 with the most preferred liquid-solid ratio being about 1:1 or about 50% solids by weight.

The feed slurry 24 is pumped to a suitable sealed reactor vessel for pressure oxidation 32 to yield a product slurry 36. While not wishing to be bound by any theory, the chemical reactions during pressure oxidation 32 for the solubilization of the copper in chalcopyrite and chalcocite are believed to be as follows:

$$4CuFeS_2+17O_2+4H_2O \rightarrow 4CuSO_4+4H_2SO_4+2Fe_2O_3$$
$$2Cu_2S+3O_2+2H_2SO_4 \rightarrow 4CuSO_4+2H_2O$$

The sulfuric acid required for complete solubilization of the copper is preferably provided in the cooling liquid 46 by the recycle of a portion of the neutralized raffinate solution 74 from solvent extraction 44 and/or the recycle of a portion of the liquid phase of the product slurry 36 and/or by the production during pressure oxidation 32 of sulfuric acid from the oxidation of the sulfide minerals in the feed slurry 24, such as chalcopyrite and pyrite.

During pressure oxidation 32, sufficient oxygen is injected into the feed slurry 24 to preferably maintain an oxygen partial pressure in the autoclave ranging from about 50 to about 300 psig. The oxygen is required to oxidize the various sulfide minerals in the feed slurry 24. The total pressure in the sealed reactor vessel is necessarily superatmospheric.

The temperature of the feed slurry 24 during pressure oxidation 32 is preferably maintained in the range of about 170° C. to about 230° C. and most preferably at about 220° C. The higher operating temperature is preferred to inhibit formation of elemental sulfur as a byproduct of the oxidation of the sulfide minerals in the feed slurry 24. Such elemental sulfur can form sulfur pellets in the reactor vessel causing operational difficulties.

To maintain the feed slurry temperature in this range, the cooling liquid 46 is contacted with the feed slurry 24 during pressure oxidation 32. The oxidation of metal sulfides is a strongly exothermic reaction, and the heat generated is generally more than that required to heat the feed slurry 24 to the desired operating temperature. Excess heat is removed and the desired operating temperature maintained by contacting the cooling liquid 46 with the feed slurry 24 in the reactor vessel. The cooling liquid 46 can be recycled liquid phase from the product slurry 36, neutralized raffinate solution 74, fresh make-up water 18, or a mixture thereof. The amount of cooling liquid 46 added to the feed slurry 24 during pressure oxidation 32 will vary according to the amount of sulfide minerals in the feed slurry 24. Generally, a sufficient amount of cooling liquid 46 is added to yield a solids content in the product slurry 36 ranging from about 4 to about 20% solids by weight. The cooling liquid 46 can be introduced in the same pipeline as that inputting the feed slurry 24 into the reactor vessel for pressure oxidation 32.

The duration of pressure oxidation 32 depends upon a number of factors, including the characteristics of the concentrated copper-containing material 17 and the pressure oxidation pressure and temperature. Preferably, the duration of pressure oxidation 32 ranges from about 1 to about 3 hours.

The preferred reactor vessel for pressure oxidation 32 is a sealed, multiple-compartment autoclave. The autoclave typically has at least six compartments to minimize short circuiting of the feed slurry 24 to the product slurry 36 as can occur in autoclaves with fewer compartments. Short-circuiting reduces the degree of completion of the pressure oxidation reaction.

Pressure oxidation 32 of the feed slurry 24 produces a product slurry 36 having a relatively high acid and metals content. Typically, the product slurry 36 includes a copper content ranging from about 20 to about 100 grams/liter, an iron content ranging from about 1 to about 50 grams/liter, and an acid content ranging from about 10 to about 100 grams/liter. More typically, the product slurry 36 has an acid content ranging from about 30 to about 50 grams/liter. The product slurry is preferably substantially free of chlorine and other contaminants which can cause problems in solvent extraction 44. The concentration of such contaminants is more preferably maintained at levels less than about 0.5% by volume. The solids phase of the product slurry 36 contains the gangue minerals in the concentrated copper-containing material 17, a variety of valuable metals (e.g., gold, silver, platinum group metals, and mixtures thereof), hematite ($Fe_2O_3$) and other iron reaction products from pressure oxidation 32. Preferably, no less than about 98% of the copper in the concentrated copper-containing material 17 is solubilized into the liquid phase of the product slurry 36 during pressure oxidation 32.

Pressure oxidation 32 is characterized by high copper recovery rates. For example, no less than about 98% of the copper in chalcopyrite and other copper sulfides can be recovered through pressure oxidation 32 utilizing the above-described conditions.

The product slurry 36 can be flashed 50 in an open vessel to release pressure and evaporatively cool the product slurry 36 through release of steam to form a flashed product slurry 54. The flashed product slurry 54 has a temperature ranging from about 85° C. to about 100° C. Approximately 20% of the liquid component of the product slurry 36 is released as steam.

The flashed product slurry 54 is subjected to liquid/solid phase separation 60 to form a residue 64 and a diluted copper-containing solution 68. The liquid/solid phase separation 60 is preferably effected in a primary thickener, which removes preferably 80% of the liquid as overflow to produce an underflow slurry of about 50% by weight solids. A wash thickener circuit with the thickeners in the wash thickener circuit being arranged in a countercurrent flow configuration can be used to complete separation of the residue 64 from the underflow slurry from the primary thickener. The wash thickener circuit preferably has between 2 and 4 thickener stages. The underflow of the wash thickener circuit is the residue 64 and the overflow is the diluted copper-containing solution 68.

A diluent 72 is contacted with the flashed product slurry 54 during liquid/solid phase separation 60 to facilitate liquid/solid phase separation and reduce the acid content of the diluted copper-containing solution 68 sufficiently to provide desirable equilibrium conditions for solvent extraction 44. To provide such conditions, the diluent 72 preferably includes no more than about 4 and most preferably no more than about 2 grams/liter acid and preferably has a pH ranging from about pH 1.8 to about pH 12 and most preferably from about pH 3 to about pH 3. The diluent 72 can be a mixture of the neutralized raffinate solution 74 and make-up water 18 as required to attain such acid levels. A sufficient amount of diluent 72 is contacted with the flashed product slurry 54 to yield an acid concentration in the diluted copper-containing solution 68 preferably ranging from about 2 to about 8 grams/liter, and most preferably from about 4 to about 6 grams/liter and a pH preferably ranging from about pH 1.2 to about pH 1.8 and most preferably from about pH 1.4 to about pH 1.6. Preferably, the ratio of diluent 72 to the liquid phase of the flashed product slurry 54 ranges from about 10:1 to about 500:1 and more preferably from about 10:1 to about 20:1. The most preferred dilution ratio is about 20:1.

Due to the large dilution ratios, the copper concentration in the diluted copper-containing solution 68 is relatively dilute with respect to that in the flashed product slurry 54. Preferably, the diluted copper-containing solution 68 contains an amount of copper ranging from about 2 to about 5 grams/liter and more preferably from about 3 to about 4 grams/liter.

The residue 64 can be treated, as desired, to recover any valuable metals contained therein. If precious metals are to be recovered from the residue 64 by cyanidation techniques, it is important to maintain the copper content in any liquid in the residue 64 to less than about 50 ppm. If no precious metals were to be recovered, the copper content in any liquid can be as high as about 200 to about 300 ppm. It is thus important to use the large amount of diluent noted above to maintain low copper and acid levels to permit optimal conditions for the recovery of precious metals.

The diluted copper-containing solution 68 can be passed through a cooling tower (not shown) for further evaporative cooling and directed to a storage pond (not shown) for temporary storage.

The diluted copper-containing solution 68 is next subjected to solvent extraction 44 and electrowinning 78 to form cathode copper 82 and raffinate solution 40. Due to the large volume of diluted copper-containing solution that must be treated by solvent extraction 44, multiple train solvent extraction circuits (i.e., typically 3 to 4 solvent extraction circuits) are preferably employed. The solvent extraction circuits are run countercurrently. The relatively high acid content of the diluted copper-containing solution 68 favors the use of relatively strong solvent extraction reagents. Such reagents include aldoximes and modified aldoximes such as "HENKELS 622N". Preferably, no less than about 98% of the copper in the diluted copper-containing solution 68 is recovered as cathode copper 82 by solvent extraction 44 and electrowinning 78.

The raffinate solution 40 contains a small amount of copper (e.g., less than about 0.10 grams/liter) and a significant amount of acid. Typically, the raffinate solution will have a sulfuric acid content ranging from about 5 to about 15 grams/liter. The increase in acid content compared to the diluted copper-containing solution 68 is caused by the use of near equilibrium conditions during solvent extraction 44 which cause acid to be exchanged for the copper, in the solvent extraction reagents. Typically, equilibrium conditions are selected such that the solvent extraction reagents collect the copper in the diluted copper-containing solution 68. The copper-bearing reagents are then subjected to more acidic conditions to shift the equilibrium conditions to cause the copper in the reagents to be exchanged for the acid in a highly acidic stripping solution (not shown). The acid-bearing reagents are contacted with the diluted copper-containing solution 68 to cause the exchange of the acid for the copper in the diluted copper-containing solution 68. The process is repeated to provide copper for electrowinning.

The raffinate solution 40 can be stored in a solution pond (not shown) and, as desired, a portion can be acid neutralized 84 to form the neutralized raffinate 74 for use in the diluent 72 and the cooling liquid 46. Acid neutralization 84 is important for maintaining a low enough acid content in the diluted copper-containing solution 68 for effective solvent extraction 44 and for preventing acid from being carried with the residue into the precious metals recovery circuit, which would decrease the recovery of precious metals. In the absence of acid neutralization 84, acid levels in the diluted copper-containing solution will gradually increase over time to excessive levels due to recycling of all or a portion of the raffinate solution 40. Such high acid levels can negatively impact copper recovery through solvent extraction and precious metals recovery through cyanidation.

Acid neutralization 84 is preferably effected by contacting the raffinate solution 40 with a base material, preferably an acid-consuming rock such as a copper oxide or sulfide ore. The acid content of the raffinate solution can thus be used to solubilize additional copper during acid neutralization 84. The use of the raffinate solution 40 to solubilize additional copper during acid neutralization can reduce acid consumption and thereby reduce operating costs. The neutralized raffinate solution 74 preferably contains no more than about 2 grams/liter of acid and more preferably no more than about 1 grams/liter of acid and preferably has a pH no less than about pH 2 and more preferably ranging from about pH 2 to about pH 4 and most preferably from about pH 2.5 to about pH 2.8. The neutralized raffinate solution 74 can be fully neutralized (e.g., be substantially free of acid) or partially neutralized (e.g., be an acid-containing solution) as desired. Depending upon the amount of copper solubilized during acid neutralization 84, the neutralized raffinate solution 74 may require additional copper removal by solvent extraction and electrowinning (not shown) to maintain the copper at acceptable levels in the residue 64. A portion of the neutralized raffinate solution may also require bleeding and alkali treatment for iron control as iron can negatively impact the recovery of copper in solvent extraction 44.

An alternative acid neutralization method is to use a base material such as lime or limestone. As noted above, such base materials are not preferred as they can react with the acid to form gypsum and thereby create a low pulp density slurry from which it is sometimes difficult to recover copper. Such base materials are also relatively expensive compared to acid-consuming rock.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for recovering copper from a copper-containing material, comprising:
   (a) leaching a copper-containing material with a liquid to yield a residue and a copper-containing solution, wherein the copper-containing solution contains an acid;
   (b) diluting the copper-containing solution with a diluting solution having a lower acid concentration than the copper-containing solution to form a diluted copper-containing solution also having a lower acid concentration than the copper-containing solution, wherein the ratio of the diluting solution to the copper-containing solution ranges from about 10:1 to about 500:1;
   (c) solvent extracting said copper from the diluted copper-containing solution to form an acidic raffinate solution; and
   (d) neutralizing the acid in the raffinate solution by contacting the raffinate solution with an acid-consuming material.

2. The method of claim 1, wherein the diluting solution has an acid concentration of no more than about 5 grams/liter.

3. The method of claim 2, wherein the diluted copper-containing solution has an acid concentration ranging from about 2 to about 8 grams/liter.

4. The method of claim 3, wherein the copper-containing solution has an acid concentration ranging from about 10 to about 100 grams/liter.

5. The method of claim 1, wherein in the solvent extraction step the diluted copper-containing solution is contacted with a solvent extraction circuit having at least 2 extraction stages.

6. The method of claim 1, wherein the leaching step is performed at superatmospheric pressure at a temperature ranging from about 170° C. to about 230° C. in an oxygen-containing atmosphere.

7. The method of claim 1, wherein in the solvent extracting step, the diluted copper-containing solution is contacted with a copper selective reagent selected from the group consisting of aldoximes, modified aldoximes, and mixtures thereof.

8. A method for recovering copper from a copper-containing material, comprising:

(a) leaching a copper-containing material with a liquid to yield a slurry containing a solid residue and a copper-containing solution, wherein the copper-containing solution contains an acid;

(b) subjecting the slurry to liquid/solid phase separation to separate the solid residue from the copper-containing solution;

(c) diluting the copper-containing solution with a diluting solution having a lower acid concentration than the copper-containing solution to form a diluted copper-containing solution also having a lower acid concentration than the copper-containing solution, wherein the ratio of the diluting solution to the copper-containing solution from about 10:1 to about 500:1;

(d) solvent extracting said copper from the diluted copper-containing solution to form an acidic raffinate solution; and (e) neutralizing the acid in the raffinate solution by contacting the raffinate solution with an acid-consuming material.

9. The method of claim 8, wherein steps (b) and (c) occur simultaneously in a thickening circuit.

10. The method of claim 8, wherein before the solvent extracting step and after the leaching step, the copper-containing solution is maintained substantially free of a base material.

11. The method of claim 8, wherein the acid consuming material is an acid-consuming rock.

12. The method of claim 8, wherein the neutralizing step includes percolating the raffinate solution through a heap of an acid-consuming rock to yield a neutralized raffinate solution, wherein the raffinate solution comprises an amount of acid ranging from about 6 to about 20 grams/liter and the neutralized raffinate solution includes an amount of acid ranging from about 0.5 to about 2.0 grams/liter.

13. A method for recovering copper from a copper-containing material, comprising:

(a) leaching a copper-containing material with a liquid to yield a slurry containing a solid residue and a copper-containing solution, wherein the copper-containing solution contains about 10 to about 100 grams/liter of an acid;

(b) subjecting the slurry to liquid/solid phase separation to separate the solid residue from the copper-containing solution;

(c) diluting the copper-containing solution with a diluting solution having a lower acid concentration than the copper-containing solution to form a diluted copper-containing solution having an acid concentration of no more than about 8 grams/liter, wherein the ratio of the diluting solution to the copper-containing solution ranges from about 10:1 to about 500:1;

(d) solvent extracting said copper from the diluted copper-containing solution in a solvent extraction circuit having at least 2 stages to form an acidic raffinate solution;

(e) neutralizing the acid in the raffinate solution by contacting the raffinate solution with an acid-consuming material; and (f) recycling the raffinate solution after step (e) to step (c).

14. The method of claim 13, wherein the diluting solution contains no more than about 5 grams/liter acid.

* * * * *

UNITED STATES PATENT AND TRADEMARK OFFICE
CERTIFICATE OF CORRECTION

PATENT NO. : 5,895,633
APPLICATION NO. : 08/990901
DATED : April 20, 1999
INVENTOR(S) : King It is certified that error appears in the above-identified patent and that said Letters Patent is hereby corrected as shown below:

The attached figure (Fig. 1) should be added after the title page.

Signed and Sealed this

Twenty-third Day of March, 2010

David J. Kappos
*Director of the United States Patent and Trademark Office*